United States Patent [19]

Stiefel et al.

[11] 4,428,565
[45] Jan. 31, 1984

[54] ARRANGEMENT FOR RESILIENT ABSORPTION OF FORCES

[75] Inventors: Christian Stiefel, Aachen; Josef Friedrichs, Krefeld-Verberg; Gino Marsella, Neuss; Horst Kahle, Krefeld, all of Fed. Rep. of Germany

[73] Assignee: Ringfeder GmbH, Krefeld, Fed. Rep. of Germany

[21] Appl. No.: 266,356

[22] Filed: May 22, 1981

[30] Foreign Application Priority Data

May 24, 1980 [DE] Fed. Rep. of Germany ....... 3020026

[51] Int. Cl.³ .............................................. F16F 3/06
[52] U.S. Cl. ................................ 267/9 A; 188/322.22
[58] Field of Search ...................... 188/322.18, 322.19, 188/322.22; 267/9 A, 9 B, 9 C, 9 R, 22 R, 151

[56] References Cited

U.S. PATENT DOCUMENTS 3,164,263  1/1965  Novikov et al. ................... 267/9 B
3,625,321  12/1971  Lutz ................................... 188/298
4,260,142  4/1981  Stiefel et al. ....................... 267/9 A

FOREIGN PATENT DOCUMENTS

878452  6/1953  Fed. Rep. of Germany ...... 267/9 B
1146708  4/1963  Fed. Rep. of Germany ...... 267/9 B Primary Examiner—Duane A. Reger
Attorney, Agent, or Firm—Michael J. Striker

[57] ABSTRACT

An arrangement for resiliently absorbing forces in various operational conditions, has a housing, a resilient element located in the housing and formed as a friction spring with a plurality of inner and outer conical rings cooperating with one another with interposition of a lubricant, and an additional body of the lubricant accommodated in an inner chamber formed inside the rings and including such a quantity of the lubricant which is sufficient for continuously replenishing the lubricant between the rings during operation of the arrangement in various operational conditions.

24 Claims, 7 Drawing Figures

ARRANGEMENT FOR RESILIENT ABSORPTION OF FORCES

BACKGROUND OF THE INVENTION

The present invention relates to an arrangement for resilient absorption of forces including a friction spring arranged inside a spring housing, such as for example for casing buffers.

Arrangements of the above-mentioned general type are known in the art. A known arrangement has a housing and a friction spring with a plurality of inner conical rings and outer conical rings having conical surfaces cooperating with one another with interposition of a lubricant, for example, a grease. Such arrangements, for example, the arrangement disclosed in the German Pat. No. 1,286,818, has been widely utilized as machine elements and generally operate as springs for casing buffers and spring mechanisms of rail vehicles. These friction springs can withstand high static and dynamic loading and provide for high damping properties. The service life of the springs is determined not only by the geometry of the rings, but also by the condition of the conical contact faces as well as the lubricants suitable for the respective type and hardness of the material of the spring, and also by the spring housing which must protect the friction spring from dust and moisture. The lubricant acting between the conical contact surfaces of the rings is applied on the inner and outer sides of the friction spring as a thin layer. It has been shown that such friction springs satisfactorily perform their intended functions in normal operational conditions. However, when the springs are highly loaded and thereby have the respectively small cone angle or when the springs operate in extreme operational conditions, for example under the action of very strong impacts, the friction of rings leads to higher temperatures which reduce the adhesion of the lubricant on the friction spring. Thereby, there is a danger that after a certain time the axially cooperating inner and outer rings will be insufficiently lubricated.

SUMMARY OF THE INVENTION

Accordingly, it is an object of the present invention to provide an arrangement for resilient absorption of forces, which avoids the disadvantages of the prior art.

More particularly, it is an object of the present invention to provide an arrangement for resilient absorption of forces which have an increased service life, also in extreme operational conditions, and provides for a constant spring action.

In keeping with these objects and with others which will become apparent hereinafter, one feature of the present invention resides, briefly stated in an arrangement which has a housing, a resilient element located in the housing and formed as a friction spring including a plurality of inner and outer conical rings cooperating with one another with interposition of a lubricant, and an additional body of the lubricant accommodated in an inner chamber formed inside the rings and operating for continuously replenishing the lubricant between the inner and outer conical rings in various operational conditions, such as mechanical or thermal conditions, in which the arrangement is intended to operate.

It has been shown by experiments that for the friction spring having the simplest construction, the quantity of the lubricant must be equal to approximately 60%-70% of the volume of the inner chamber formed by the inner and outer rings. It is thereby guaranteed that the friction spring can be unobjectionably loaded until blocking of its rings and the portions of the friction spring extending outwardly beyond the lubricant are sufficiently lubricated under the action of the sudden loads applied to the lubricant during the impacting process, by a so-called spray or injection effect.

In accordance with another feature of the present invention, the above-mentioned injection effect is increased by an insert element arranged in the inner chamber inside the body of the lubricant and designed for distributing the lubricant during the impacts.

Still another feature of the present invention resides in the fact that the insert element arranged in the inner chamber inside the body of the lubricant may be formed as a sleeve provided with a shoving portion.

When the above-mentioned lubricant quantity of 60%-70% is reduced and at the same time the uniform distribution of the lubricant must be attained, the insert element in accordance with a further feature of the present invention is formed as a cylindrical bar or column of elastically deformable material, for example, foam rubber, and has an outer diameter which is smaller than the inner diameter of the inner rings, so that the lubricant is accommodated in an annular gap between the bar and the rings. When the friction spring is loaded, the insert element increases its outer diameter and pumps the lubricant located in the gap toward the conical contact surfaces of the rings, and when the friction ring is unloaded, the lubricant is aspirated back.

Still a further feature of the present invention resides in the fact that the elastically deformable insert element may be constituted of such a material which absorbs the lubricant. Thereby, an additional supply of the lubricant in the structure of the insert element is available and can be formed before the assembling of the friction spring.

Tensioning of the friction spring is performed by two cup-shaped pressure members having flanges abutting against the end rings of the friction spring and connected with one another by a central threaded member. Thereby the friction spring is formed as a self-contained unit which is easy to manipulate and to build in. In accordance with the invention a sealing element is provided in the region in which the threaded member extends through the pressure cups so as to prevent the outward leakage of the lubricant.

In accordance with a further feature of the present invention, the sealing has an especially simple construction when the sealing element is arranged in engaging manner in the central opening of the pressure cups and retained by a nut. This construction is also suitable for subsequent fitting of the inserted spring, since the opening of the pressure cup must be respectively worked.

In accordance with another embodiment of the invention, the sealing in the region of the passage of the threaded element through the pressure cups is attained by the specific construction of the insert formed as an elastically deformable bar, wherein the bar has end portions of a cup-shaped cross-section corresponding to the cross-section of the pressure cups and sealingly abutting against the latter.

Yet another feature of the present invention resides in the fact that at least one of the pressure cups is provided with a sealingly closeable inlet opening for supplying the lubricant.

It is possible that the lubricant unintentionally escapes from the inner chamber of the rings, for example, because of a defect in the sealing in the region of the passage of the threaded members through the pressure cups, or must be intensionally accommodated outside of the inner chamber. For preventing losses of the lubricant in the above-mentioned cases, inner and outer housing parts which together form the spring housing are provided with sealing means including a sealing element arranged therebetween.

The housing of the friction spring is composed, as a rule, of two housing parts which are telescopically movable one inside the other and have brace plates for supporting the respective ends of the friction spring. In accordance with an additional feature of the present invention, the sealing element is composed of two shell members arranged on the wall of the outer housing part, nd a sealing body embedded in these shells, the sealing body being formed as a sealing ring, a sealing rope or the like. Such a sealing body can be replaced without disassembling of the housing of the friction spring.

In order to prevent compression of the lubricant accommodated in the inner chamber during the impacts, a plurality of grooves are provided in the inner surfaces of the base plates, the grooves extending in a radial direction and being uniformly distributed in a circumferential direction. These grooves serve during the impacts as flow passages for flowing the lubricant in an inner space of each pressure cup abutting against the respective base plates.

With the assumption that the housing of the friction spring is sealed, the lubricant in accordance with still additional feature of the present invention, is accommodated under pressure, and a volume-compressible pressure equalizing element for example of polyurethan foam material is arranged in the housing. In such a construction regardless of the position and loading of the friction spring, a particularly uniform distribution of the lubricant is guaranteed. The volume compressible pressure equalizing element provides for practically no increase of the lubricant pressure during impacts so that the characteristic curve of the friction spring remains approximately constant. The pressure of the lubricants together with the tension force of the friction spring advantageously provide for the return of the housing in its initial position after removal of the impact force.

For providing safety arrangement of the pressure equalizing element and thereby preventing damage to the rings of the spring during the operation, the pressure equalizing element is arranged stationarily in the housing of the friction spring. For example, it may be immovably mounted on the threaded element connecting the pressure cups or arranged inside the pressure cup.

The housing of the friction spring is provided with a valve for supplying the lubricant. Thereby, fast filling of the lubricant and formation of pressure in the arrangement is guaranteed.

When the arrangement is designed in accordance with the present invention, the inner and outer axially cooperating conical rings of the friction spring are always supplied with the lubricant even in extreme operational conditions. As a result of this the friction spring has a considerably longer service life and in all applications has an optimum spring characteristic curve as in just manufactured condition. Generally speaking, the arrangement in accordance with the present invention is more economical than the known arrangements.

The novel features which are considered as characteristic for the invention are set forth in particular in the appended claims. The invention itself, however, both as to its construction and its method of operation, together with additional features and advantages thereof, will be best understood from the following description of specific embodiments when read in connection with the accompanying drawings.

DESCRIPTION OF PREFERRED EMBODIMENTS

An arrangement for resiliant absorption of forces is shown in FIGS. 1-4 and includes a resilient element formed as a friction spring including a plurality of inner rings 1 and outer rings 2. The inner rings 1 and the outer rings 2 have conical contact surfaces 1a and 2a and cooperate with interposition of a lubricant 3, such as for example, a grease. The friction spring is arranged in a housing including housing parts 8 and 9 and protecting the friction springs from dust and moisture.

Figure 1:
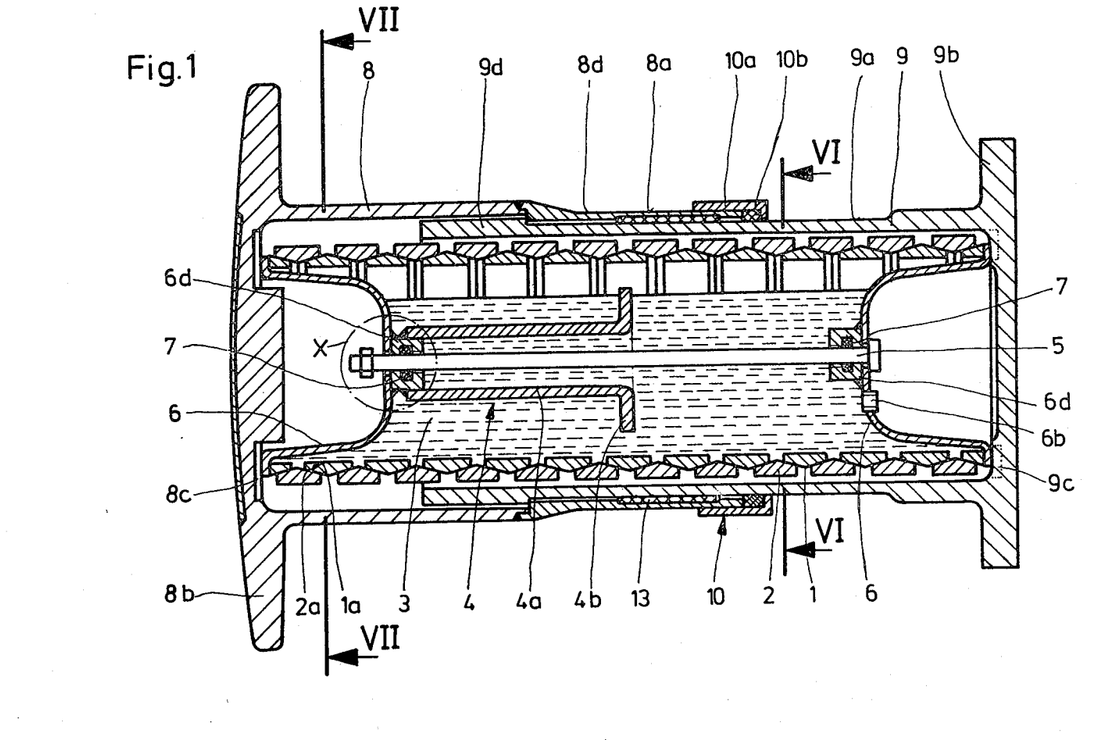
FIG. 1 is a view showing a friction spring arranged in a housing formed as a casing buffer for a rail vehicle, in accordance with the present invention.
Figure 2:
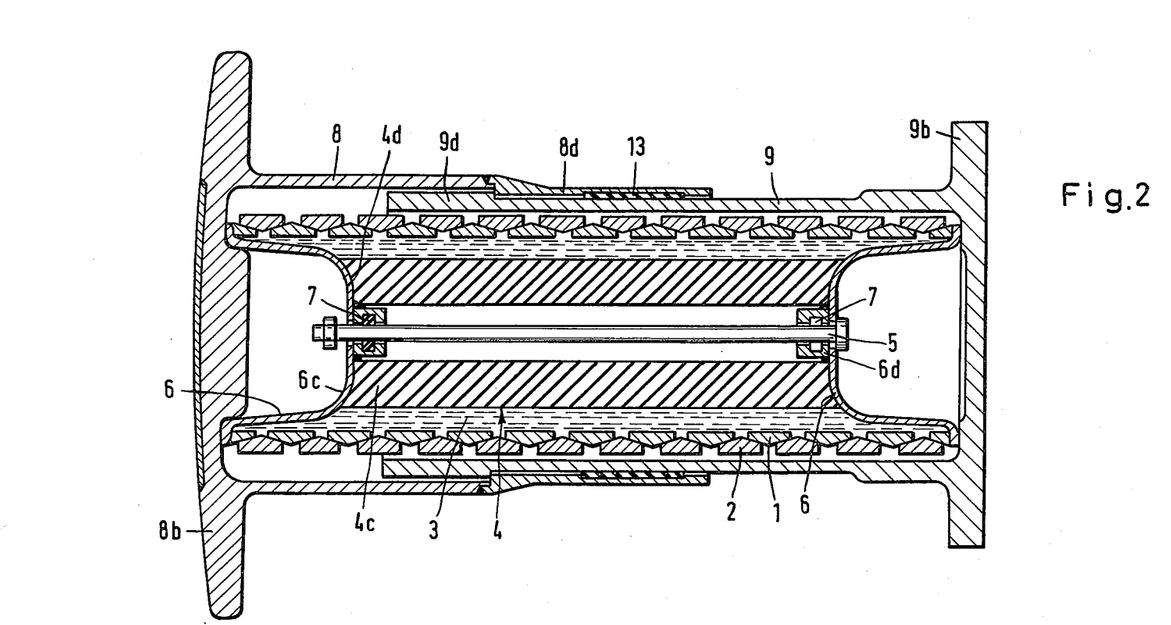
FIG. 2 is a view substantially corresponding to the view of FIG. 1 but showing the friction spring in accordance with another embodiment of the present invention.
Figure 3:
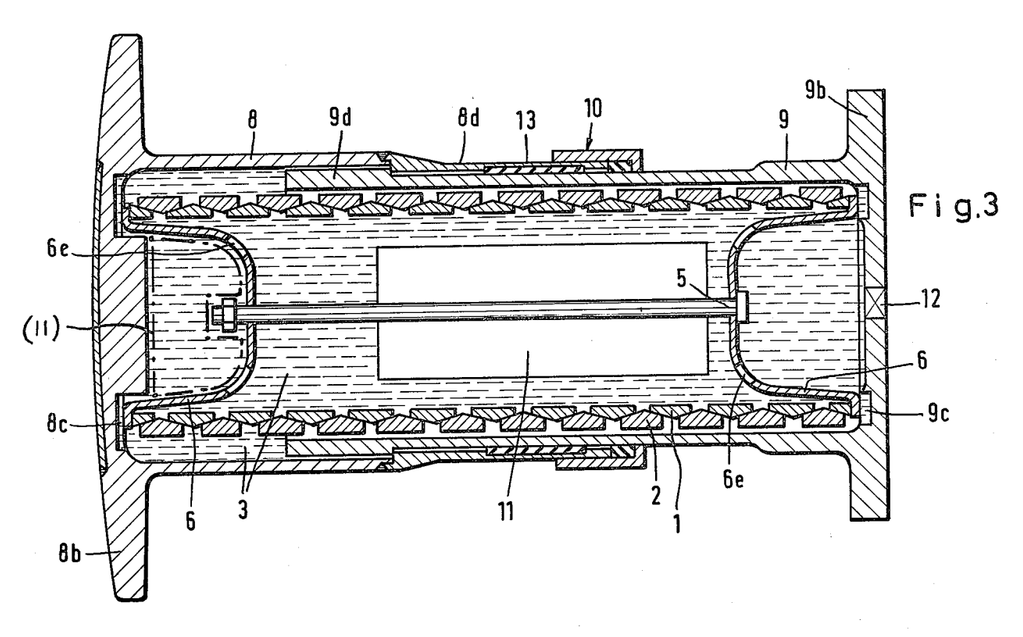
FIG. 3 is a view substantially corresponding to the view of FIG. 2 but showing the friction spring in accordance with a further embodiment of the invention.

The housing of the friction spring shown in FIGS. 1-3 is formed as a casing buffer of a rail vehicle and includes the outer housing part 8 and the inner housing part 9 which move telescopically one inside the other and have a base plate 8b and 9b, respectively. The friction spring abuts by its ends against the base plates 8b and 9b. The displacement of the housing parts 8 and 9 is limited by a slotted ring 8d which is welded on the open end of the outer housing part 8 and abuts against a collar 9d of the inner housing part 9. A slide bush 13 is received in the ring 8d. Prior to insertion into the housing parts 8 and 9, the rings 1 and 2 of the friction spring shown in FIGS. 1-3 are tensioned by pressure cups 6 connected with one another by a central threaded member 5, so as to form a self-contained spring unit.

The inner and outer rings 1 and 2 of the friction spring shown in FIG. 1 bound an inner chamber which is filled with an additional body of lubricant 3. The body of the lubricant fills approximately 70% of the inner chamber and suffices for all operational conditions. During impacts the body of the lubricant 3 is subjected to sudden loads leading to a so-called spray or injection effect. Thereby the portions of the rings 1 and 2 extending outwardly beyond the lubricant 3 are also supplied in the desired manner with the lubricant 3. For improving the injection effect, an insert 4 is provided. The insert 4 has a sleeve 4a and a shoving or paddle portion 4b formed on the former. The insert 4 is connected with the pressure cup 6 which is movable under the action of the impacts. One of the pressure cups 6 has an inlet opening 6b for supplying the lubricant 3 into the inner chamber. The inlet opening 6b is closeable by a threaded plug.

Figure 5:
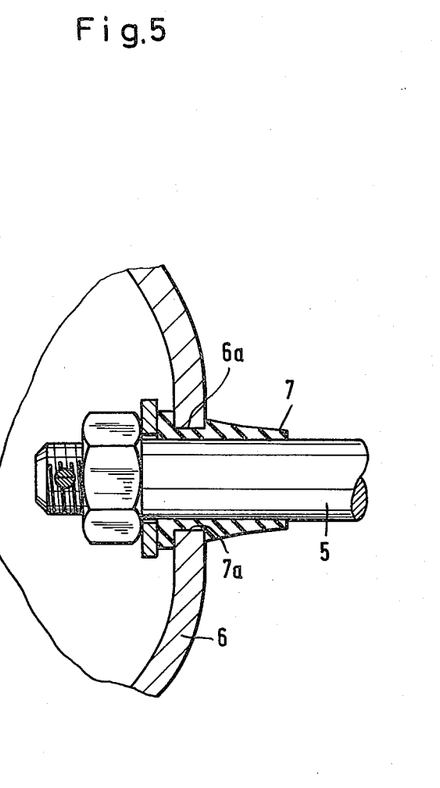
FIG. 5 is a view showing the unit X of FIG. 1 at an enlarged scale, in accordance with still a further embodiment of the invention.

The threaded member 5 extends through the pressure cups 6 at predetermined locations and a sealing element 7 is arranged at those locations. The sealing elements 7 prevent flowing of the lubricant 3 outwardly of the inner chamber of the friction spring. As shown in FIG. 1 the sealing element 7 is arranged in a holding element 6a which is welded on the pressure cap 6. Such a holding element 6d can also be formed of one-piece with the pressure cup 6. As shown in FIG. 5, the sealing element 7 can be arranged in a central opening 6a of the pressure cup 6 so as to engage the latter and retained by a nut 7a.

Figure 6:
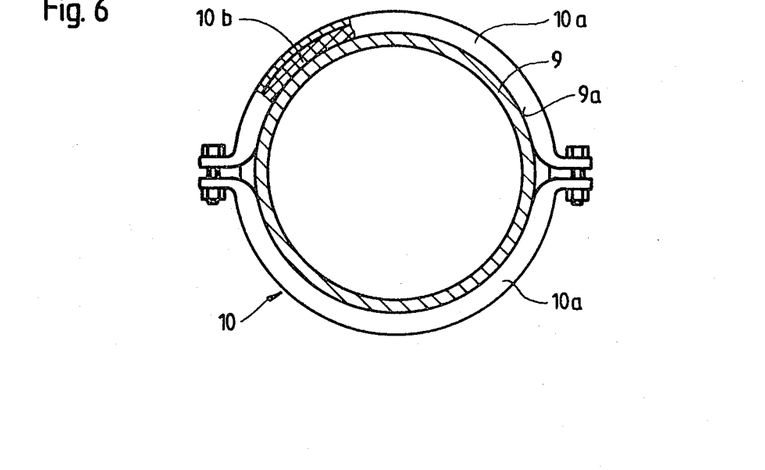
FIG. 6 is a view showing a sealing element in a section taken along the line VI—VI in FIG. 1.

A sealing element 10 is further provided for preventing flowing of the lubricant 3 outwardly of the inner chamber of the friction spring, for example, in the event of defects in the above-mentioned sealing or breakage of the rings 1 and 2. The sealing element 10 prevents losses of the lubricant in these cases. The sealing element 10 is composed of two shells 10a, as shown in FIG. 6, which are arranged on a wall 8a of the outer housing part 8, and a sealing body 10b embedded in the shells 10a. The sealing body 10b may be formed as a sealing ring, a sealing rope and the like. The sealing body 10b abuts against a wall 9a of the inner housing part 9.

Figure 7:
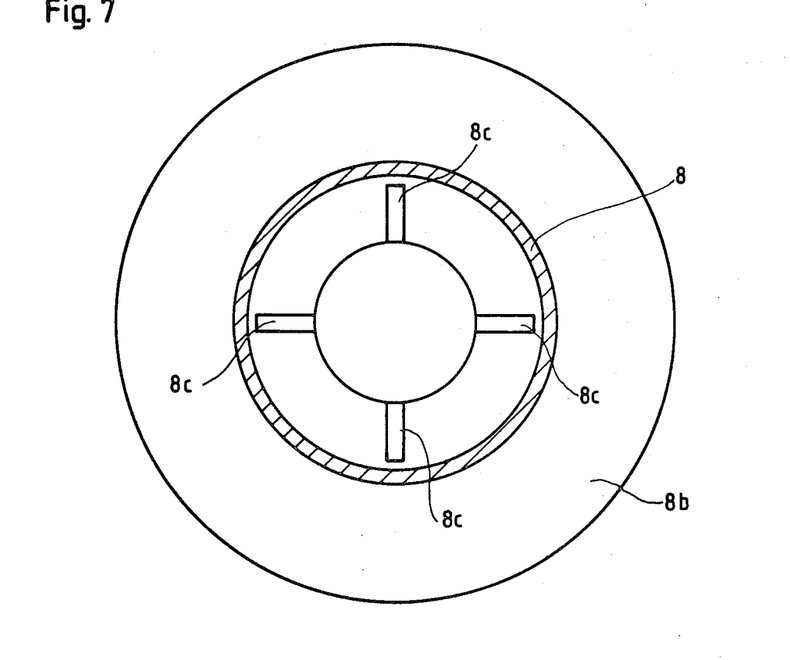
FIG. 7 is a view showing a bottom of one housing part in a section taken along the line VII—VII in FIG. 1.

Compression of the lubricant 3 which can be accommodated in some cases outside of the inner chamber bounded by the rings 1 and 2, can be prevented by radially extending grooves 8c which are formed in a base plate 8b of the outer housing part 8 and uniformly distributed in the circumferential direction thereof, as shown in FIG. 7. The grooves 8c actually form flow passages for flowing the lubricant 3 into the space provided inside the left pressure cup 6, as seen in FIG. 1. Alternatively, or additionally, the base plate 9b of the inner housing part 9 may also be provided with grooves 9c which are shown in dotted lines in FIG. 1.

In the arrangement shown in FIG. 2, means is provided for reducing the quantity of the lubricant 3 and simultaneously distributing the latter. This means include the insert 4 which is formed in this case as a cylindrical bar 4c of elastically deformable material, advantageously foam rubber. The bar 4c has an outer diameter which is smaller than the inner diameter of the inner rings 1, and thereby the lubricant 3 is accommodated in an annular gap between the bar 4c and the rings 1 and 2.

It is especially advantageous when the bar 4c is constituted of a material which can receive the lubricant 3 therein, so that a supply of the lubricant 3 is available. As for the sealing in the region of the passage of the threaded member 5 through the pressure cups 6, the bar 4c has end portions provided with recesses 4d which have a cross-section corresponding to the cross-section of cup-shaped portions 6c of the pressure cups 6. The above-mentioned seal 7 is provided in addition to this sealing. It is to be understood that the grooves 8c or 9c in the base plates 8b or 9b of the housing parts 8 or 9, as well as the sealing element 10 for the housing parts 8 and 9, may also be provided in the arrangement shown in FIG. 2.

The arrangement shown in FIG. 3 also has the sealing element 10 which seals the housing parts 8 and 9 against one another. However, in this arrangement the lubricant 3 is also accommodated in a space located outside the inner chamber of the friction spring and fills the housing 8, 9 under pressure. For providing especially uniform distribution of the lubricant 3 regardless of the inner position and loading conditions of the friction spring, a volume-compressible pressure equalizing element 11 is provided in the arrangement. The pressure equalizing element 11 is mounted immovably on the threaded member 5 which connects the pressure cups 6 with one another. The pressure-equalizing element may be located not only between the pressure cups as shown in solid lines in FIG. 3, but also inside one of the pressure cups as shown in dotted lines. The pressure equalizing element 11 is constituted of polyurethane foam material. It guarantees that during impacts practically no increase of the pressure for the lubricant 3 takes place. The grooves 8c and 9c in the base plate 8b and 9b of the housing parts 8 and 9, as well as openings 6e in the pressure cups 6 serve for a uniform filling of the lubricant 3. The lubricant 3 is supplied via a valve 12 arranged in the base plate 9b of the housing part 9.

Figure 4:
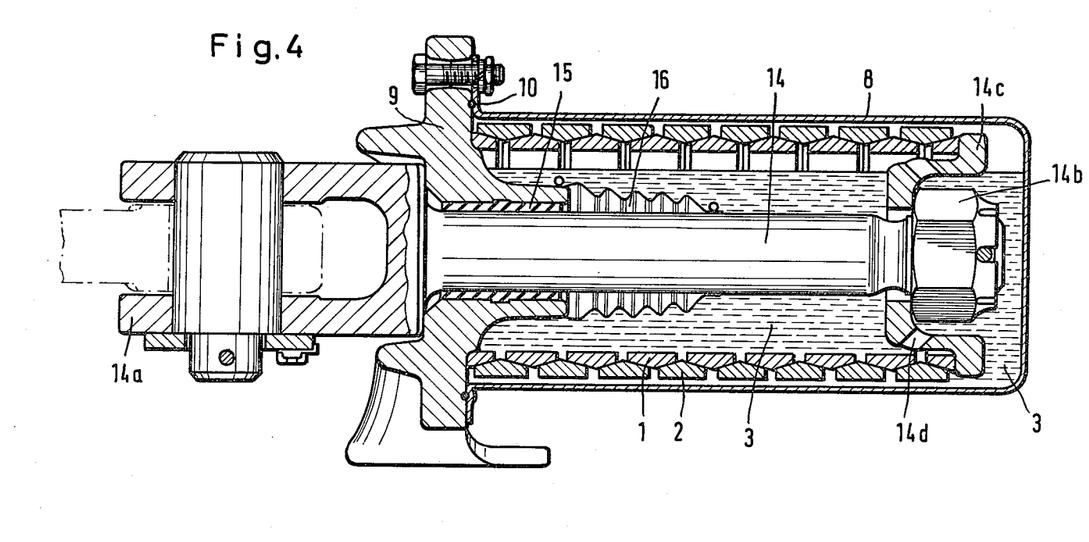
FIG. 4 is a view showing a friction spring in accordance with the present invention, in connection with a pulling device of the rail vehicle.

FIG. 4 shows a pulling device of a rail vehicle associated with the friction spring and forming an enclosed housing including the housing parts 8 and 9. A pulling rod 14 is supported in the housing part 9 and the sealing element 10 is arranged for sealing the housing parts 8 and 9 against one another. A bush 15 and a bellows 16 are arranged in the region in which the pulling rod 14 extends through the housing part 9 and seal the latter. Similarly, to the arrangement of FIG. 1, the rings 1 and 2 of the friction spring shown in FIG. 4 bound the inner chamber, and the additional body of lubricant 3 for the spring is accommodated inside the housing part 8. Pulling forces are transmitted via a coupling fork 14a of the pulling rod 14, a nut 14b arranged at the end of the latter, and a pulling element 14c to the friction spring. The friction spring is compressed in direction towards the housing part 9 forming a support bearing. Through-going openings 14d in the pulling element 14c serve for compensation of the respective volumes of the lubricant between the inner space inside the friction spring and the housing part 8. This is performed in a reversed order during expansion of the friction spring.

It is to be understood that the arrangement in accordance with the present invention can be utilized in pulling and pushing devices of rail vehicles or in other machine elements.

It will be understood that each of the elements described above, or two or more together, may also find a useful application in other types of constructions differing from the types described above.

While the invention has been illustrated and described as embodied in an arrangement for resilient absorption of forces, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for resiliently absorbing forces in various operational conditions, particularly for buffers, comprising an elongated housing having an axis; a resilient element located in said housing and formed as a friction spring having a plurality of inner conical rings with a predetermined inner diameter and a plurality of outer conical rings cooperating with one another with with interposition of a lubricant, said inner and outer rings bounding an inner chamber; and an additional body of the lubricant accommodated in said inner chamber bounded by said inner and outer rings and including such a quantity of the lubricant which is sufficient for continuously replenishing the lubricant between said inner conical rings and said outer conical ring during operation of the arrangement in various operational conditions; and means for distributing the lubricant during impact delivered upon the arrangement and including an insert element arranged in said inner chamber inside said body of the lubricant, said insert of said distributing means being formed as a bar member of elastically deformable material and having an outer surface with a diameter which is smaller than the inner diameter of said inner conical rings so that said inner chamber is formed and said body of the lubricant is accommodated between said inner conical rings and the outer surface of said bar member.

2. An arrangement for resiliently absorbing forces in various operational conditions, particularly for buffers, comprising an elongated housing having an axis; a resilient element located in said housing and formed as a friction spring having a plurality of inner conical rings and a plurality of outer conical rings cooperating with one another with interposition of a lubricant, said inner and outer rings bounding an inner chamber; and an additional body of the lubricant accommodated in said inner chamber bounded by said inner and outer rings and including such a quantity of the lubricant which is sufficient for continuously replenishing the lubricant between said inner conical rings and said outer conical ring during operation of the arrangement in various operational conditions, said friction spring having two axially spaced ends and two end conical rings each located at a respective one of said ends; and two pressure cups each having a flange portion abutting against a respective one of said end conical rings, a central threaded member extending through each of said pressure cups at a predetermined location and connecting said pressure cups with one another, and sealing means arranged at said locations and preventing outward flow of the lubricant from said inner chamber.

3. An arrangement for resiliently absorbing forces in various operational conditions, particularly for buffers, comprising an elongated housing having an axis; a resilient element located in said housing and formed as a friction spring having a plurality of inner conical rings and a plurality of outer conical rings cooperating with one another with interposition of a lubricant, said inner and outer rings bounding an inner chamber, said friction spring having two axially spaced ends, said housing having two housing parts which surround said inner and outer conical rings and are sealed against one another, each of said housing parts having a base portion for supporting a respective one of said ends of said friction spring, the base portion of at least one of said housing parts having an inner surface which faces toward said inner chamber and is provided with a plurality of grooves, said grooves extending in a radial direction and being uniformly distributed over said inner surface in a circumferential direction; and an additional body of the lubricant accommodated in said inner chamber bounded by said inner and outer rings and including such a quantity of the lubricant which is sufficient for continuously replenishing the lubricant between said inner conical rings and said outer conical ring during operation of the arrangement in various operational conditions.

4. An arrangement for resiliently absorbing forces in various operational conditions, particularly for buffers, comprising an elongated housing having an axis; a resilient element located in said housing and formed as a friction spring having a plurality of inner conical rings and a plurality of outer conical rings cooperating with one another with interposition of a lubricant, said inner and outer rings bounding an inner chamber; and an additional body of the lubricant accommodated in said inner chamber bounded by said inner and outer rings and including such a quantity of the lubricant which is sufficient for continuously replenishing the lubricant between said inner conical rings and said outer conical ring during operation of the arrangement in various operational conditions, said body of the lubricant being arranged inside said inner chamber under pressure; and a pressure equalizing means located in said inner chamber, said pressure equalizing means including a volume-compressible pressure equalizing element arranged in said chamber inside said body of the lubricant and constituted of polyurethane foam material.

5. An arrangement for resiliently absorbing forces in various operational conditions, particularly for buffers, comprising an elongated housing having an axis; a resilient element located in said housing and formed as a friction spring having a plurality of inner conical rings and a plurality of outer conical rings cooperating with one another with interposition of a lubricant, said inner and outer rings bounding an inner chamber, said friction spring having two axially spaced ends and two conical rings each located at a respective one of said ends; and an additional body of the lubricant accommodated in said inner chamber bounded by said inner and outer rings and including such a quantity of the lubricant which is sufficient for continuously replenishing the lubricant between said inner conical rings and said outer conical ring during operation of the arrangement in various operational conditions, said body of the lubricant being arranged inside said inner chamber under pressure; a pressure equalizing means located in said inner chamber and including a volume-compressible pressure equalizing element arranged in said inner chamber inside said body of the lubricant and is mounted stationarily relative to said housing; and pressure cups each having a flange portion abutting against a respective one of said end conical rings, and a central threaded member connecting said pressure cups with one another, said volume-compressible pressure equalizing element being immovably mounted on said threaded member.

6. An arrangement as defined in claim 1, wherein said inner conical rings and said outer conical rings of said friction spring cooperate with one another with interposition of a grease, said additional body of the lubricant being a body of the grease.

7. An arrangement as defined in claim 1; and further comprising distributing means having an insert which is formed as a sleeve member provided with a shoving portion.

8. An arrangement as defined in claim 1, wherein said bar member is cylindrical, said inner chamber being formed as a ring-shaped gap between said inner conical rings and said outer surface of said bar member.

9. An arrangement as defined in claim 1, wherein said bar member is constituted of foam rubber material.

10. An arrangement as defined in claim 2, wherein each of said pressure cups has an opening through which said threaded member extends, said sealing means including a sealing member arranged in each of said openings in engagement with a respective one of said pressure cups, and means for retaining said sealing member in each of said openings.

11. An arrangement as defined in claim 10, wherein said retaining means includes a nut located adjacent to a respective one of said pressure cups at its side facing away from said inner chamber and abutting against a respective one of said sealing members so as to retain the latter in the respective opening.

12. An arrangement as defined in claim 1, wherein said friction ring has two axially spaced ends and two end conical rings each located at a respective one of said ends; and further comprising two pressure cups each having a flange portion abutting against a respective one of said end conical rings, and a central threaded member connecting said pressure cups with one another, said bar member of elastically deformable material having a cup-shaped end portions each sealingly abutting against a respective one of said pressure cups.

13. An arrangement as defined in claim 2, wherein at least one of said pressure cups has a sealingly closable inlet opening for supplying the lubricant into said inner chamber.

14. An arrangement as defined in claim 1, wherein said housing includes two housing parts which surround said inner and outer conical rings and are sealed against one other.

15. An arrangement as defined in claim 14; and further comprising a sealing element arranged between said housing parts and sealing the latter against one another.

16. An arrangement as defined in claim 15, wherein said housing parts includes an outer housing part and an inner housing part which are telescopically movable relative to one another, said sealing element including two shell members retained on said outer housing part, and a sealing body embedded in said shell members and abutting against said inner housing part.

17. An arrangement as defined in claim 16, wherein said sealing body of said sealing element is a sealing ring.

18. An arrangement as defined in claim 16, wherein said sealing body of said sealing element is a sealing cord.

19. An arrangement as defined in claim 2, wherein said body of the lubricant is arranged inside said inner chamber under pressure; and further comprising a pressure equalizing means located in said inner chamber.

20. An arrangement as defined in claim 19, wherein said pressure equalizing means includes a volume-compressible pressure equalizing element arranged in said inner chamber inside said body of the lubricant.

21. An arrangement as defined in claim 20, wherein said volume compressible pressure equalizing element is mounted stationarily relative to said housing.

22. An arrangement as defined in claim 21, wherein said friction spring has two axially spaced ends and two conical rings each located at a respective one of said ends; and further comprising two pressure cups each having a flange portion abutting against a respective one of said end conical rings, and a central threaded member connecting said pressure cups with one another, said volume-compressible pressure equalizing element being immovably arranged inside one of said pressure cups.

23. An arrangement as defined in claim 19, wherein said housing has a valve member for supplying the lubricant into said inner chamber.

24. An arrangement as defined in claim 1, wherein said inner chamber has a predetermined volume, the quantity of said additional body of the lubricant being equal to substantially 60–70% of the volume of said inner chamber.

* * * * *